June 10, 1930. T. P. LITTLE 1,762,828
CUTTING MACHINE
Filed April 16, 1928
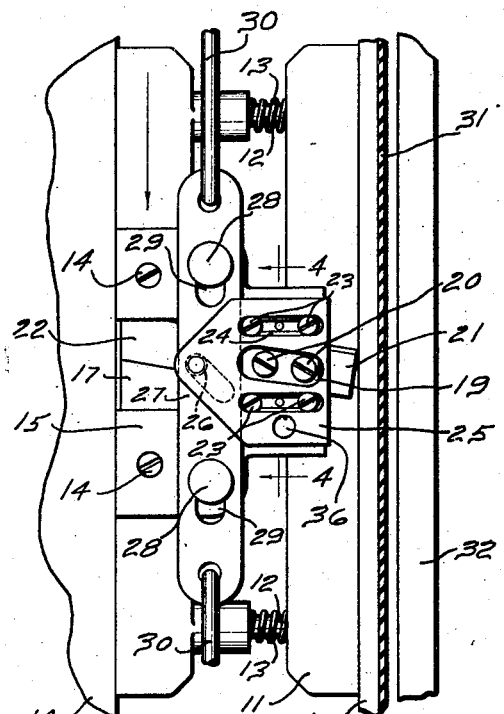
Fig. 1.
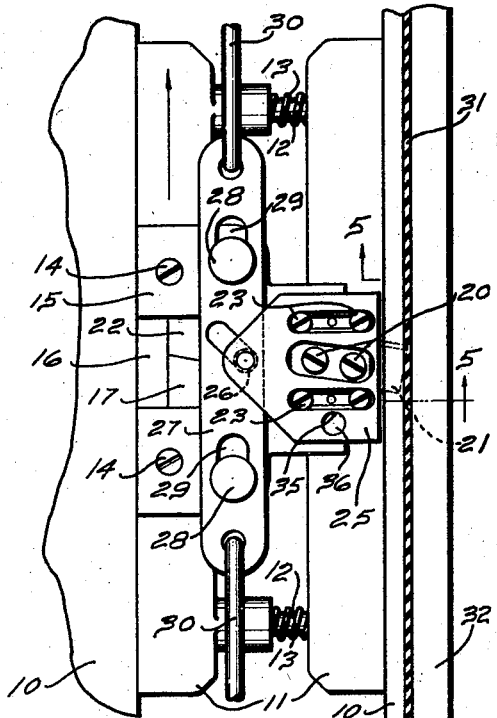
Fig. 2.
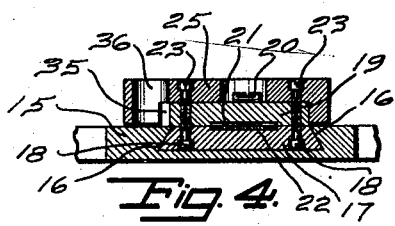
Fig. 4.
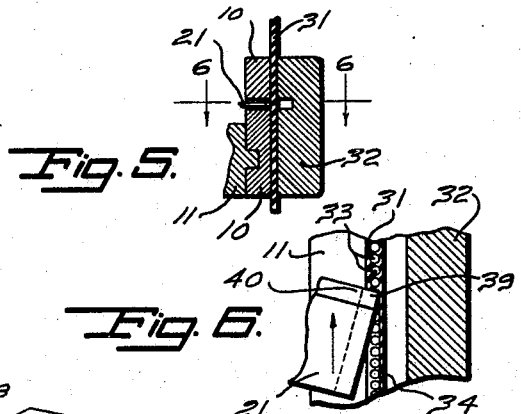
Fig. 5.
Fig. 6.
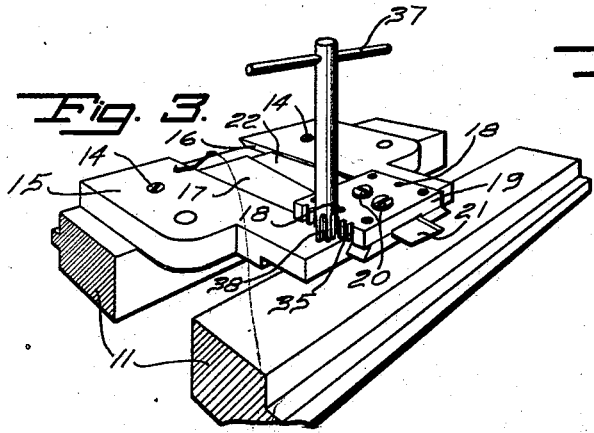
Fig. 3.
INVENTOR.
THOMAS P. LITTLE.
BY
ATTORNEY.

Patented June 10, 1930

1,762,828

UNITED STATES PATENT OFFICE

THOMAS P. LITTLE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS

CUTTING MACHINE

Application filed April 16, 1928. Serial No. 270,202.

My invention relates to fabric cutting machines and more particularly to machines for cutting rubberized cord material on the bias for use in the manufacture of tires and the like and has for its object to provide an improved cutting mechanism to be used in machines of this character which permit a vernier adjustment of the cutting knife. Another object of my invention is to provide a cutter which is adapted to use inexpensive knives such as safety razor blades. Other and further objects will be apparent from the following specification and claims:

Letters Patent #1,384,984, issued July 19, 1921, describe a cutting and stripping machine and in the accompanying specification and drawings I describe and illustrate a cutting mechanism embodying my invention which may be used in this type of machine.

In the drawings—

Fig. 1 is a plan view of the cutter mechanism showing the position of parts during the inoperative return stroke;

Fig. 2 is a plan view similar to Fig. 1 but showing the position of parts in the operative stroke;

Fig. 3 is a partial perspective view of the cutter showing the adjusting key;

Fig. 4 is a sectional view taken on line 4—4 of Fig. 1;

Fig. 5 is a sectional view taken on line 5—5 of Fig. 2; and

Fig. 6 is a sectional view taken on line 6—6 of Fig. 5 but on a larger scale.

Referring to the drawings, 10 represents fixed guideways in which travel complementary members 11 assembled by pins 12 and springs 13 to form a carriage to which is attached, by bolts 14, a cutter base 15 in which is formed a slideway 16 guiding a slide 17. Bolts 18 secure to slide 17 a block 19, see Fig. 3, which bears set screws 20 to hold a knife 21 in a groove 22 formed in slide 17, the latter with block 19 thus forming a support for the knife. Adjustably secured to block 19 by bolts 23 engaging in slots 24 is a member 25 which carries a cam roller 26 engaging with a cam member 27 which is in turn loosely mounted by pins 28 and slots 29 to the cutter base 15. The ends of the cam member 27 are secured to a suitable driving cable 30 which is driven by any suitable apparatus not shown, to slide the members 11 carrying the cutter back and forth in the guideways 10 performing the cutting operations.

It will be evident that as the cutter is operated in the direction of the arrow shown in Fig. 1 the knife 21 through the action of cam member 27 and cam roller 26 will be held away from the stock 31 and that as the cutter motion is reversed to the direction shown by the arrow in Fig. 2 the knife 21 will be brought to the stock 31 to perform the cutting operation. It will be understood that during this time the stock 31 has been advanced and the holding bar 32 has moved from the position shown in Fig. 1 to that shown in Fig. 2 by mechanism which has been omitted from the drawings as it is not part of the invention.

As is shown in Fig. 6, it is sometimes desirable to cut only part way through the stock, severing only the cords 33 and leaving a layer of rubber 34 uncut, permitting the semi-cut stock to be wound in rolls. As can be readily seen, adjustments of the knife 21 to produce such cuts must necessarily be minute and prior to my invention these adjustments were accomplished by loosening the set screws 20 and moving the knife 21, making an adjustment difficult to obtain. On my improved cutter I have provided means for obtaining adjustments rapidly and accurately. Gear teeth are cut on block 19 to form a rack 35 and a hole 36 is formed in the member 25 positioned in such relation to the rack 35 that when a key 37 bearing a gear 38 is inserted it engages the said rack 35. To accomplish the adjustment the knife 21 is inserted in the groove 22 and fastened in approximately the right location by set screws 20 and after loosening the bolts 23 and inserting the key 37 into engagement with the rack 35, the knife 21, block 19, and slide 17 acting as a unit, can be advanced or retracted in relation to the hood 25 and as the correct adjustment is reached the screws 23 are tightened.

As it is advantageous to use inexpensive knives such as safety razor blades the groove 22 is formed on an angle thus realizing their use without alteration and as the cutting point 39 becomes dull the blade may be broken on the dotted line shown in Fig. 6, establishing a new point at 40.

Having thus described my invention, I claim:

1. In a device of the character described, means for adjusting the extent of projection of a reciprocating knife which comprises a knife support, a rack formed on the knife support, a reciprocable cam actuated member adjustably secured to the support and operable under the influence of its cam to move the support transversely of the general path of its reciprocation to project the knife into and out of cutting position, said cam actuated member being formed to receive a geared key engaging with said rack to advance or retract the knife support in relation to the cam actuated member to thereby vary the extent of the projection of the knife in its cutting position.

2. In a device of the character described, a reciprocable knife support having a groove, a thin knife, sharpened along substantially the entire length of one of its longitudinal edges, adjustably positioned in the groove, said groove being inclined relative to the general path of reciprocation of the support so that one corner of the knife acts as a cutting point, a rack formed on the knife support, a reciprocable cam actuated member adjustably secured to the knife support and operable under the influence of its cam to move the support transversely of the general path of its reciprocation to project the knife into and out of cutting position, said cam actuated member being formed to permit engagement of the rack by a geared key to advance or retract the knife support in relation to the cam actuated member to thereby vary the extent of the projection of the knife in its cutting position.

THOMAS P. LITTLE.